United States Patent
Gemilang et al.

(10) Patent No.: US 9,688,385 B2
(45) Date of Patent: Jun. 27, 2017

(54) TRAIL-EDGE FLAP SYSTEM FOR A WING OF AN AIRCRAFT

(71) Applicant: Airbus Operations GmbH, Hamburg (DE)

(72) Inventors: Atra Surya Gemilang, Bremen (DE); Wolfgang Voege, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 141 days.

(21) Appl. No.: 14/564,701

(22) Filed: Dec. 9, 2014

(65) Prior Publication Data

US 2015/0166170 A1  Jun. 18, 2015

(30) Foreign Application Priority Data

Dec. 18, 2013  (EP) .................................... 13198114

(51) Int. Cl.
  *B64C 9/18* (2006.01)
  *B64C 9/16* (2006.01)
(52) U.S. Cl.
  CPC . *B64C 9/18* (2013.01); *B64C 9/16* (2013.01)
(58) Field of Classification Search
  CPC .................................. B64C 9/16; B64C 9/18
  See application file for complete search history.

(56) References Cited

U.S. PATENT DOCUMENTS

| 1,495,519 | A |   | 5/1924 | Isles |   |
|---|---|---|---|---|---|
| 2,405,726 | A |   | 8/1946 | Zap |   |
| 4,405,105 | A | * | 9/1983 | Dilmaghani | B64C 9/16 244/213 |
| 4,471,928 | A | * | 9/1984 | Cole | B64C 9/00 244/215 |
| 4,605,187 | A | * | 8/1986 | Stephenson | B64C 9/04 244/216 |
| 4,725,026 | A | * | 2/1988 | Krafka | B64C 9/16 244/213 |

(Continued)

FOREIGN PATENT DOCUMENTS

| DE | 10328540 B4 | 2/2008 |
|---|---|---|
| EP | 0154047 A1 | 9/1985 |

(Continued)

OTHER PUBLICATIONS

European Patent Office, European Search Report for European Patent Application No. 13198114.4 mailed Jun. 24, 2014.

(Continued)

*Primary Examiner* — Philip J Bonzell
*Assistant Examiner* — Michael Kreiner
(74) *Attorney, Agent, or Firm* — Lorenz & Kopf, LLP

(57) ABSTRACT

A trailing-edge flap system for a wing of an aircraft comprises a trailing-edge flap, a guide rail attached to the trailing-edge flap, a carriage slidably engaging the guide rail and rotatably attachable to a fixed position on the wing structure, and a drive means coupled the wing structure to a first joint on the guide rail. The drive means is configured to move the trailing-edge flap relative to the wing structure by moving the guide rail along the carriage by moving the first joint relative to the wing structure, such that the trailing-edge flap translates and rotates. The trailing-edge flap is at least movable into a cruise position, a high-lift position and an air brake position.

15 Claims, 4 Drawing Sheets

(56) References Cited

U.S. PATENT DOCUMENTS

| | | | | |
|---|---|---|---|---|
| 5,094,412 A | * | 3/1992 | Narramore | B64C 3/50 244/130 |
| 2011/0006155 A1 | * | 1/2011 | Kracke | B64C 9/02 244/99.3 |
| 2011/0101175 A1 | * | 5/2011 | Lauwereys | B64C 9/22 244/213 |

FOREIGN PATENT DOCUMENTS

| | | |
|---|---|---|
| EP | 0210399 A2 | 2/1987 |
| EP | 0503158 A1 | 9/1992 |
| EP | 1398269 A1 | 3/2004 |
| EP | 2272752 A2 | 1/2011 |
| EP | 2316727 A1 | 5/2011 |
| GB | 2277305 A | 10/1994 |
| WO | 9105699 A1 | 5/1991 |

OTHER PUBLICATIONS

European Patent Office, European Search Report for European Patent Application No. 13198114.4 mailed Dec. 7, 2016.

\* cited by examiner

TRAIL-EDGE FLAP SYSTEM FOR A WING OF AN AIRCRAFT

CROSS-REFERENCE TO RELATED APPLICATION

This application claims the priority to European Patent Application No. 13 198 114.4, filed Dec. 18, 2013 which is incorporated herein by reference in its entirety.

TECHNICAL FIELD

The subject matter described herein relates to a trailing-edge flap system for a wing of an aircraft.

BACKGROUND

Modern commercial aircraft usually comprise high lift systems that are able to drastically increase the lift of the aircraft during start and landing phases for enabling a low flight velocity. A large variety of high lift systems is known that may comprise leading edge flaps or slats and trailing edge flaps movably supported relative to the wing.

A trailing-edge flap movably supported relative to the wing is a high lift device that is configured to increase the lift coefficient of the wing by increasing the camber and/or the surface area of the wing. For example, in a drop flap system, a trailing-edge flap is merely rotated around a hinge line relative to the wing, such that the camber of the wing is adjustable. In more advanced flap systems, the trailing-edge flap is moved/extended beyond a trailing-edge of a wing structure and rotated around a hinge line. Optionally, a gap is created between the flap and the wing structure that allows air flowing from an underside of the wing to its upper side through the gap. This delays a flow separation, thereby enabling the aircraft to assume higher angles of attack. These trailing-edge flaps are known as "Fowler" flaps.

For moving such a Fowler flap, basically two different system designs are common. In a rail system, a guide rail is attached to the wing structure, and a carriage is guided on the guide rail and supports the trailing-edge flap through a joint, while a drive means is coupled with another joint of the trailing-edge flap so as to move it along the guide rail.

A trailing-edge flap system having a guide rail is known from EP 0503158 B1 that discloses a combined bearing and guide rail for a carriage that is movable thereon and on which the flap is movably held, and a setting drive which acts on a driving lever. A driving rod connects the driving lever to the carriage, and a two-armed lever is mounted on the carriage, of which one arm is connected by way of a control rod to the driving lever and the second arm is flexibly connected to the flap.

Also, trailing-edge flap systems are known that use a telescopic drive for moving the trailing-edge flap and a multi-lever system for rotation of the trailing-edge flap. Such a system is inter alia known from DE 10 328 540 B4.

Objects, desirable features, and characteristics of embodiments described herein will become apparent from the subsequent summary and detailed description, and the appended claims, taken in conjunction with the accompanying drawings and this background.

SUMMARY

The common trailing-edge flap systems provide only a limited trailing-edge flap angle and may require a prominent fairing for cladding their kinematical structure in order to influence the aerodynamic characteristics of the aircraft as little as possible.

It is therefore an object of an embodiment to provide a trailing-edge flap system for a wing of an aircraft that provides larger flap angles compared to known flap systems increases the lift during takeoff and landing, and provides clearly larger flap angles for the use as airbrakes and such.

A trailing-edge flap system for a wing of an aircraft, the wing having a wing structure, is proposed. The trailing-edge flap system comprises a trailing-edge flap, a guide rail attached to the trailing-edge flap, a carriage slidably engaging the guide rail and rotatably attachable to a fixed position on the wing structure, and a drive means couplable with the wing structure and with a first joint on the guide rail. The drive means moves the trailing-edge flap relative to the wing structure by moving the guide rail along the carriage through moving the first joint relative to the wing structure, such that the trailing-edge flap translates and rotates, and wherein the trailing-edge flap is movable into a cruise position, a high-lift position and an air brake position.

The wing structure may be a part of a wing structure, to which the trailing-edge flap system is attached. The wing structure may comprise any suitable components for carrying or supporting the trailing-edge flap system and may include a support beam, a bracket or merely a set of bolts, threads and through-holes for attaching the trailing-edge flap system to the wing. However, the wing structure may be realized as a separate support structure for carrying the trailing-edge flap system, which support structure is attachable to a wing of an aircraft.

The trailing-edge flap is a flow body with an upper surface, a lower surface, a leading edge, and a trailing edge. The wing and the trailing-edge flap is designed such that the trailing-edge flap constitutes a part of the wing in cruise flight conditions, and is fully retracted into a neutral position. For this purpose, the wing may comprise a recess or an indentation, into which the leading edge of the trailing-edge flap may reach. The trailing edge of the flap creates the trailing edge of the wing itself.

Preferably, the trailing-edge flap is a self-contained hollow component; i.e. the trailing-edge flap has structural stability that allows it to be easily moved between and held at several positions by means of only a limited number of supports. For this purpose it is preferred to manufacture the trailing-edge flap as a combination of ribs, stringers, and a skin attached to the ribs and stiffened by the stringers, thus providing a lightweight and stiff component.

The guide rail attached to the flap may comprise a cross-sectional profile that has a base section and a guide or rail section. The base section, which is commonly of a flat and slim shape and protrudes vertically to a structure, merely positions and supports the guide or rail section, which is to be engaged by the carriage. The guide or rail section extends from the trailing-edge flap to a predetermined distance preferably vertical to an underside of the trailing-edge flap and allows engaging the carriage, such that the guide rail is displaceably or slidably supported on the carriage, when the carriage is attached to the wing structure. This means, that the guide section of the guide rail may be moved along the carriage.

The carriage itself may comprise at least two pairs of opposed wheels, wherein the opposed wheels are separated by a gap between which the guide section of the guide rail is positionable. Also, the pairs of opposed wheels are arranged at a distance from each other, such that the guide section runs through at least two gaps of two pairs of opposed wheels. It goes without saying, that three, four or more pairs of opposed wheels may be used, wherein two groups with one or two pairs of opposed wheels may be arranged at both sides of the base section of the guide rail profile to prevent the guide rail slipping off the carriage. By using two, three or four gaps between opposed wheels, a precise kinematical relationship between the guide rail and the carriage can easily be maintained. The carriage thereby reliably follows the curvature of the guide rail, which preferably is zero, i.e. the guide rail is linear.

The carriage being rotatably attached to a wing structure hinders the carriage from conducting a translative motion relative to the wing structure. However, being rotatably attached to the wing structure reliably allows the compensation of variable guide rail angles during the relative motion between the guide rail and the carriage.

The flap drive means may comprise a plurality of different devices for providing a driving force to the first joint of the guide rail for urging the guide rail along the carriage into an extended or a retracted position. For example, a telescopic actuator may be provided that is configured to increase or decrease its length, wherein the actuator is coupled between a structural point of the wing structure or the structural component and the first joint on the guide rail. However, a large variety of other drive means such as spindle drives and rotary actuators may be feasible and may also include one or more levers, rods or other parts located between the actuator and the guide rail.

A gist of the embodiment lies in attaching the guide rail to the trailing-edge flap that is to be moved relative to the wing, resulting in a rather small sized fairing for cruise condition, in which the kinematical elements do not extend into the surrounding of the aircraft as far as the kinematical elements of common trailing-flap systems. Still further, the trailing-edge flap system according to the embodiment allows a translation and relative rotation of the trailing-edge flap and, based on the design of the guide rail, the position of the first joint and the position of a point of rotation of the guide rail relative to the wing structure, for rotating the trailing-edge flap to much higher angles of attack than possible in common systems, e.g. 90°. This is possible without sacrificing the aerodynamic characteristics of the aircraft, neither in cruise flight nor in a high lift situation.

In a preferred embodiment, the guide rail is firmly attached to the trailing-edge flap. This means that the guide rail cannot provide any relative motion to the trailing-edge flap. For example, a base section of the guide rail may extend through an underside of the trailing-edge flap, and a rail section engaging the carriage extends out of the trailing-edge flap. The base section of the guide rail may be an integral part, e.g. an extended stiffening rib, or it may simply be attached to a skin of the trailing-edge flap.

In another preferred embodiment, the first joint is positioned on an upstream end of the trailing-edge flap. The upstream end is to be understood as a region with a small distance to the leading edge of the trailing-edge flap, facing the wing structure when the trailing-flap system is installed at the wing. The distance to an actuator, being located close to an indentation or recess of a main wing structure, may be minimized and the creation of large angles of attack is greatly simplified.

In a still further advantageous embodiment, the flap drive means comprises an actuator and a connection link that is coupled to the first joint of the guide rail and an articulation point of the actuator. Through the use of such a connection link, it is possible to bridge larger distances between the actuator and the first joint of the guide rail, and it is easily possible to compensate for alignment deviations between the trailing-edge flap and the flap drive means, i.e. an actuator thereof. In this regard, the connection link may be understood as a rod that is coupled the actuator and the guide rail in an articulated manner. The articulation point is considered a section of an actuator that is coupled to the connection link.

In an advantageous embodiment, the flap drive means, the guide rail, and the carriage constitute a five-linkage-track-chain. A great advantage is the large angle of rotation for the flap and a Fowler movement at the same time.

Still further, the actuator may be a rotary actuator that is configured for rotating the articulation point exclusively on a first plane, which first plane has a fixed spatial relationship to the wing and the aircraft as a whole, respectively. This means, that instead of providing a telescopic actuation as in common systems, a rotation is conducted. For example, a rotary actuator may be a hydraulic actuator, a pneumatic actuator, or an electromagnetic actuator (e.g. an electric motor), which preferably has a direct connection to the articulation point. However, especially when the rotary actuator has a high level of rotational speed and a rather low torque, e.g. in case the rotary actuator is based on an electric motor, the rotary actuator may comprise a gear arranged between the articulation point and the rotary actuator itself.

Still further, the drive means may comprise a swing lever connected to the articulation point of the actuator and the connection link, which in turn is connected to the first joint of the guide rail. Through the swing lever, the achievable distance between the actuator and the joint of the guide rail is still further increased. However, it is preferred that the swing lever is configured for exclusively pivoting on the first plane. Through this limitation, the degree of motion is limited in such a manner that the trailing-edge flap only has one associated position directly depending on the position of the articulation point of the actuator. Also, for the same reasons, the connection link may be configured for exclusively pivoting on the first plane about its connection joint with the swing lever.

Still further, the first joint is configured so as to be rotatable exclusively about a fifth rotational axis that is parallel to the first plane. Hence, the connection link may only conduct a rotation about the first joint, and move in a second plane being vertical to the first plane. Hence, it is impossible for the trailing-edge flap to move in a lateral or rotational manner with a fixed position of the articulation point even if a swing lever and a connection link are employed.

It is also preferred that the carriage is rotatably attached to the wing structure by means of a second joint having a single second joint axis parallel to the first plane. Hence, the carriage may rotate only in the same rotational direction as the connection link around the first joint of the guide rail. Therefore, the trailing-edge flap may only be rotated in one direction, while the actuator and the swing lever may only be rotated in a direction vertical thereto. Furthermore, the second joint axis is parallel to the first joint axis.

The embodiment further relates to an aircraft having a wing and at least one such trailing-edge flap assembly.

BRIEF DESCRIPTION OF THE DRAWINGS

The various embodiments will hereinafter be described in conjunction with the following drawing figures, wherein like numerals denote like elements, and wherein.

Further characteristics, advantages, and application options are disclosed in the following description of the exemplary embodiments in the figures. All the described and/or illustrated characteristics per se and in any combination form the subject of the embodiment, irrespective of their composition in the individual claims or their interrelationships. Furthermore, identical or similar components in the figures have the same reference characters.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
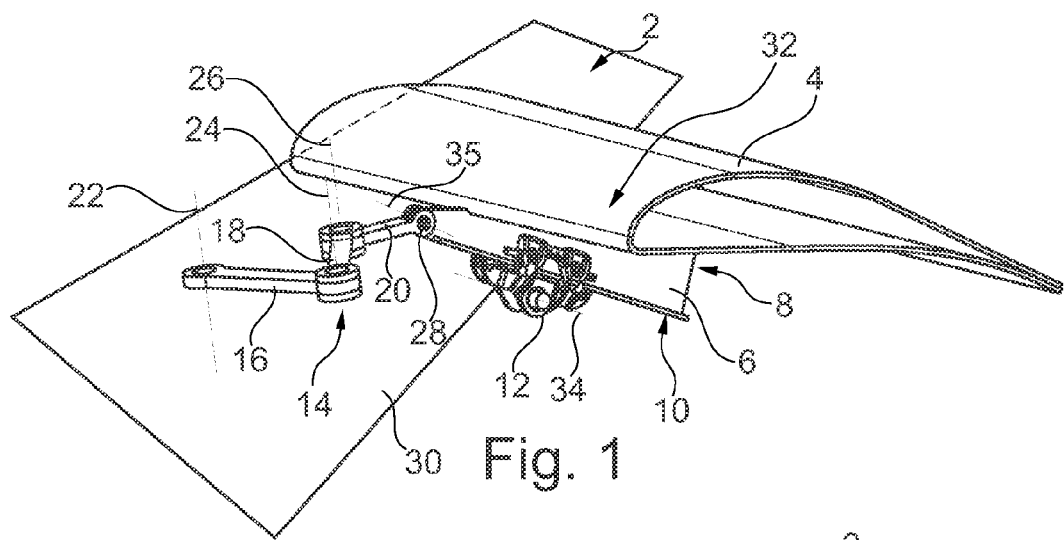
FIG. 1 shows a trailing-edge flap system in an overview.

FIG. 1 shows a trailing-edge flap system 2 in a three-dimensional overview. Here, a trailing-edge flap 4 comprises a guide rail 6 that has a profile with a cross-sectional surface having a base section 8 and a guide section 10, which guide section is designed for being engaged by a carriage 12. In the present exemplary embodiment, the guide rail 6 is a linear guide rail, which means that the curvature is zero or close to zero. The trailing-edge flap system 2 is coupled with a drive means 14 for moving the trailing-edge flap 4. The drive means 14 is coupled with or comprises an actuator that is not shown in the figures. However, from the drawings it should be clear that a rotary actuator may be feasible for providing a driving force.

The drive means 14 comprises a drive lever 16 that may coupled with and driven by the rotary actuator, a swing lever 18, and a connection link 20. The drive lever 16 rotates about a first rotational axis 22 that may coincide with a rotational axis of the rotary actuator, and the swing lever 18 is supported in an articulate manner so as to be pivotable around a second rotational axis 24 that is arranged substantially parallel to the first rotational axis 22. The swing lever 18 is connected to the connection link 20 in an articulate manner about a third rotational axis 26 that in turn is substantially parallel to the first rotational axis 22 and the second rotational axis 24.

Hence, from the rotary actuator that is not depicted in FIG. 1, to a first joint 28 located on an upstream end of the guide rail 6, all parts of the drive means 14 may only move on a single first plane 30. The first joint 28 may therefore only move on or parallel to the first plane 30, which clearly limits the vertical displacement of a leading edge 32 of the trailing-edge flap 4.

The carriage 12 is rotatably supported on a wing structure that is not depicted in FIG. 1 for the sake of providing sufficient visibility of the core components. The carriage 12 may rotate around a single fourth rotational axis 34, which exemplarily extends parallel to the first plane 30. However, the carriage 12 may be coupled to the wing structure by means of a ball joint or a sphere joint that reliably allows any rotational motion compensation.

When the carriage 12 is rotatably only about the fourth rotational axis 34, the carriage 12 may only rotate around a rotational axis that is vertical with respect to the rotational axes of the drive lever 16, the swing lever 18, and the connection link 20. When moving the guide rail 6 through the drive means 14, it will be gradually tilted due to the constraining rotation around the first joint 28, i.e. a fifth rotational axis 35, depending on the actual position of the carriage 12. As will be apparent from the following figures, this leads to a translation of the trailing-edge flap together with a distinct rotation thereof, i.e. a Fowler motion and a rotation at the same time.

Figure 2:
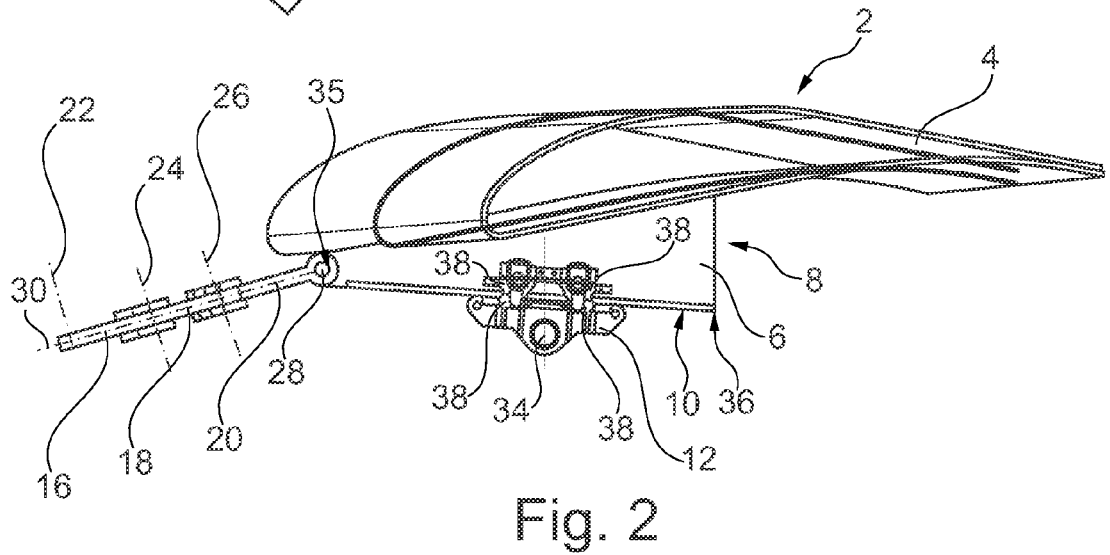
FIG. 2-9 show the trailing edge flap system in different states of extension in lateral and top views.

FIG. 2 shows the trailing-edge flap system 2 in a lateral view in a cruise flight position. Here, the first joint 28 is in a forwardmost position, the drive lever 16, the swing lever 18, and the connection lever 20 constitute a compact arrangement. This means, that the carriage 12 has a relative position rather close to a rear end 36 of the guide rail 6 that is in a forwardmost position, such that the flap 4 is basically horizontally positioned.

In this figure it is more visible that the carriage 12 comprises at least two pairs of guide wheels 38 that enclose the rail section 10 of the guide rail 6 so as to maintain a position fixed in a vertical direction relative to the rail section 10. Hence, the carriage 12 always runs parallel to the rail section 10 of the guide rail 6.

Figure 3:
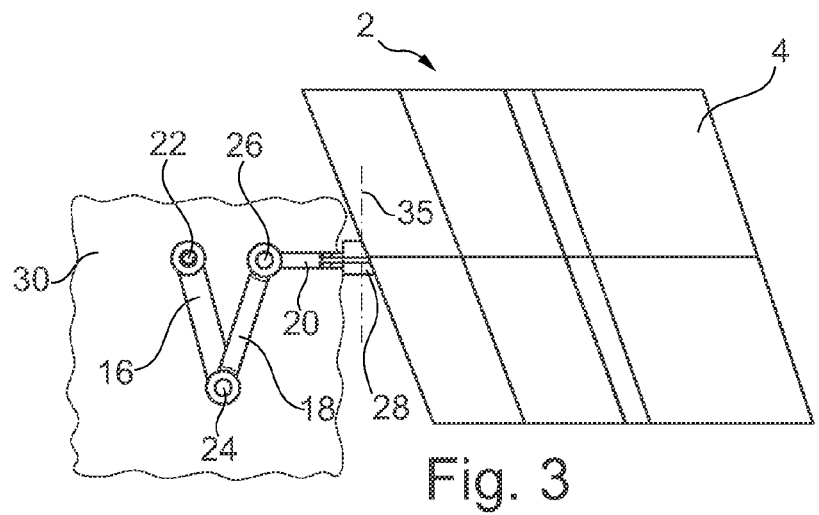

In FIG. 3, the trailing-edge flap system 2 of FIG. 2 in cruise flight position is shown in a top view. Here, it is clearly apparent that the drive lever 16 and the swing lever 18 enclose a rather small angle and constitute a very compact arrangement that only requires installation space in a lateral direction.

Figure 4:
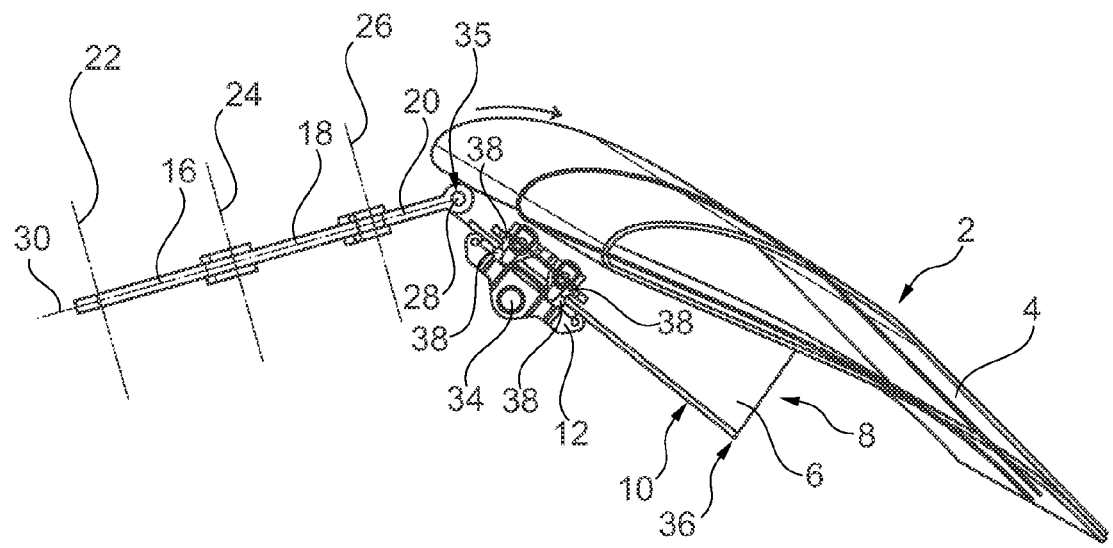
Figure 5:
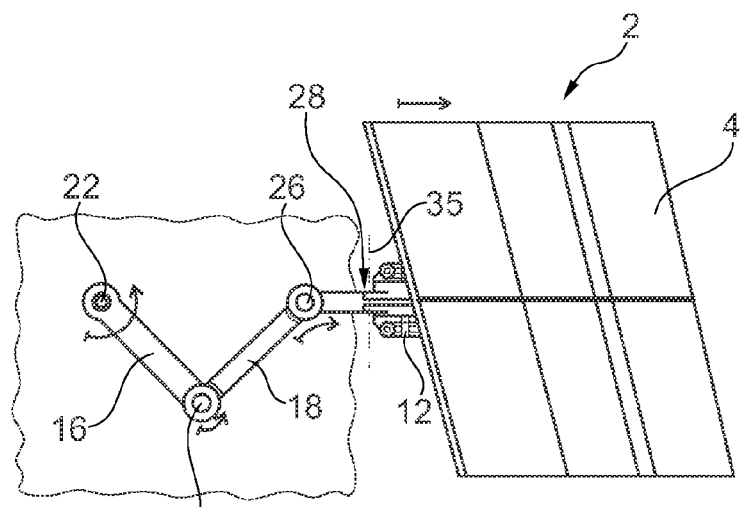

In FIGS. 4 and 5, the trailing-edge flap system 2 is shown in a lateral view (FIG. 4) and a top view (FIG. 5). Here, the angle between the drive lever 16 and the swing lever 18 is approximately 90°, and the guide rail 6 is moved further backwards along the carriage 12. Due to this translation of the guide rail 6, the first joint 28 and the carriage 12 approach each other, and the guide rail 6 may hardly move any further along the carriage 12. Consequently, besides a translational motion, also a clear rotation occurs that leads to a increased angle of attack of the trailing-edge flap 4 compared to the cruise flight position shown in FIGS. 2 and 3. Resultantly, this may be a position feasible for the start of the aircraft, i.e. one of a plurality of possible high-lift positions.

Figure 6:
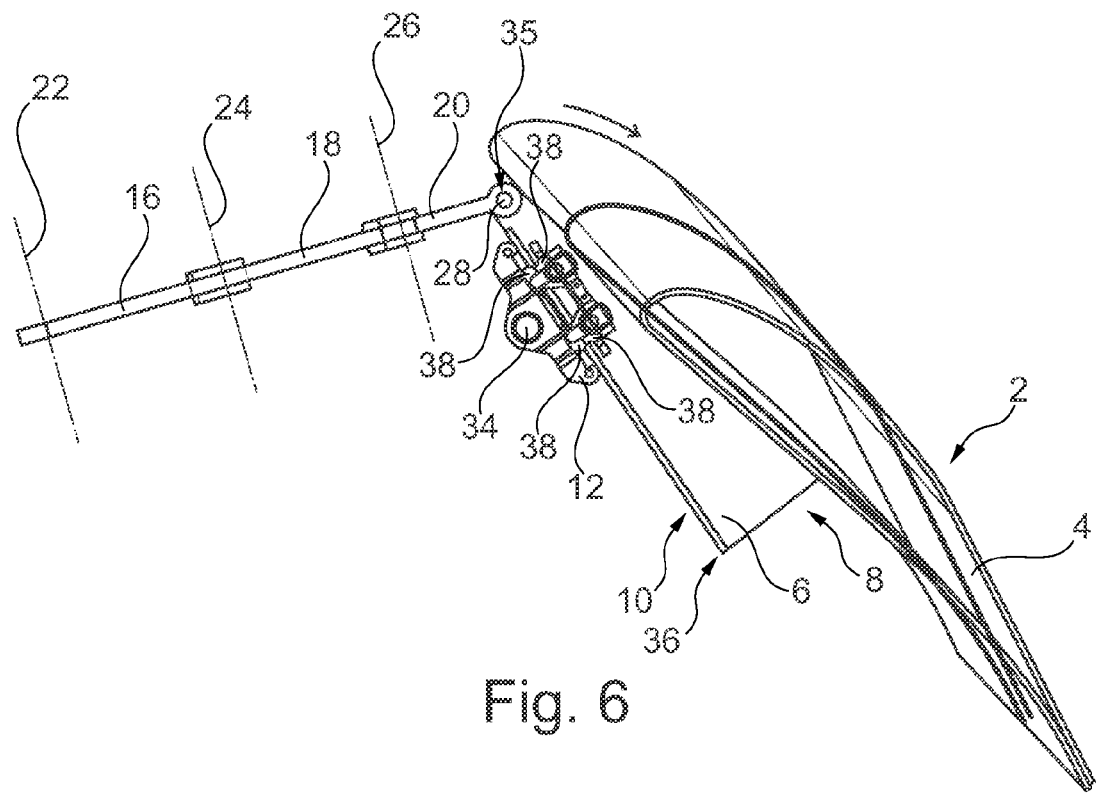
Figure 7:
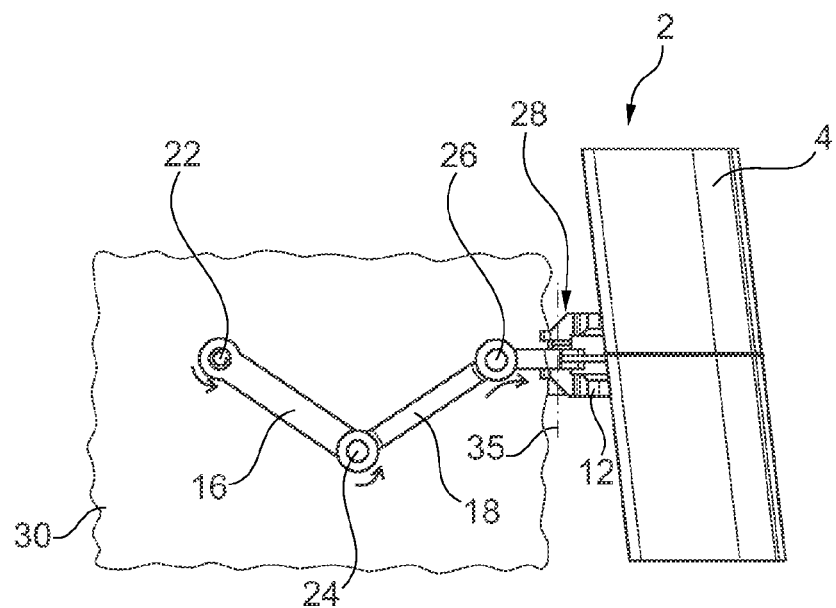

In FIGS. 6 and 7, the trailing-edge flap 4 is further rotated into a position feasible for landing, i.e. another one of a plurality of high-lift positions. The angle between the drive lever 16 and the swing lever 18 is clearly increased over 90° and the guide rail 6 is hardly moved relative to the carriage 12, compared to FIGS. 4 and 5. Hence, the prominent motion component from the high-lift position shown in FIGS. 4 and 5 is the rotation about the fourth rotational axis 34, around which the carriage 12 rotates.

Figure 8:
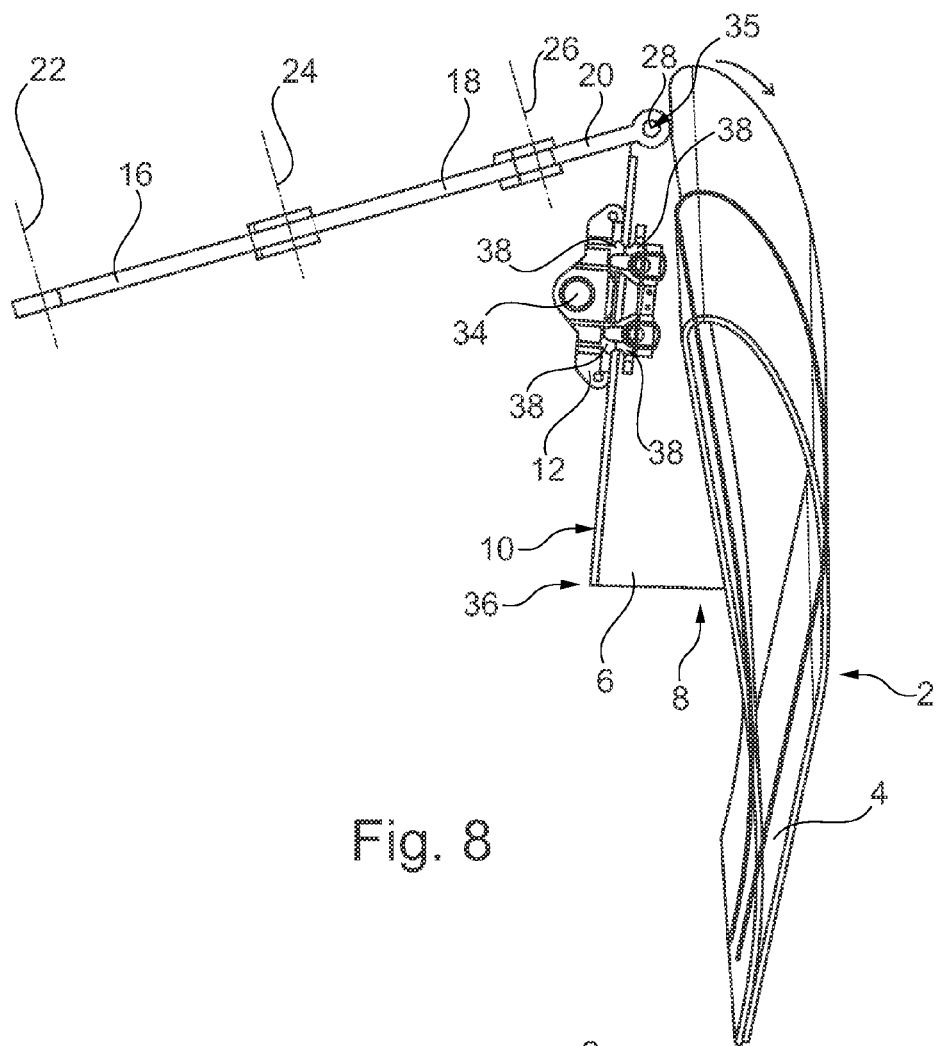
Figure 9:
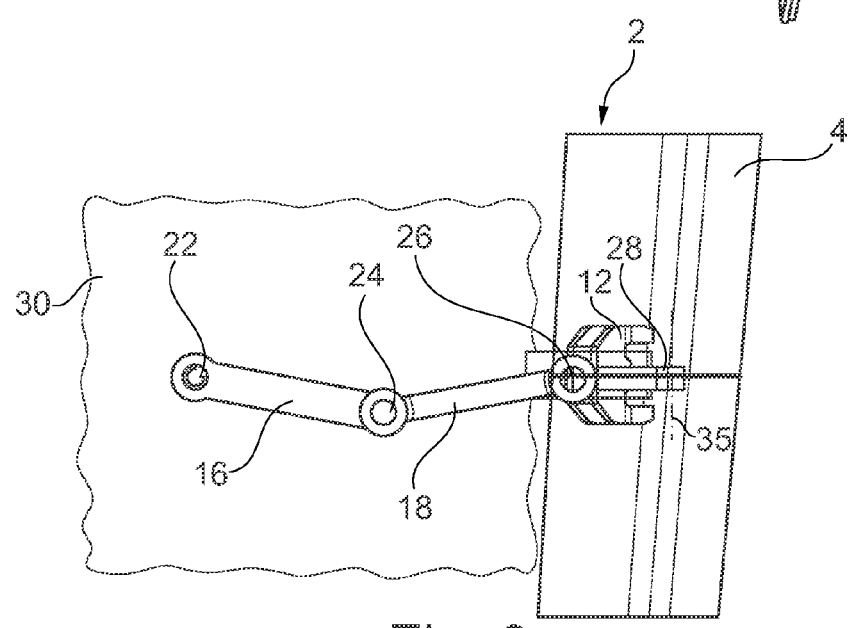

Finally, FIGS. 8 and 9 show the trailing-edge flap 4 in an air-brake position, in which the trailing-edge flap 4 is almost vertical to the position of FIG. 2 and faces the impinging flow substantially vertically with its underside. Here, the guide rail 6 has not moved relative to the carriage 12 at all, compared to FIGS. 6 and 7, but merely an additional rotation has taken place. In this position, the trailing-edge flap 4 can be used as an air-brake.

It should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Furthermore reference characters in the claims are not to be interpreted as limitations.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A trailing-edge flap system for a wing of an aircraft, the wing having a wing structure, the trailing-edge flap system comprising:
    a trailing-edge flap;
    a straight guide rail attached to the trailing-edge flap;
    a carriage slidably engaging the guide rail and rotatably attachable to a fixed position on the wing structure; and
    a drive means coupled to the wing structure and to a first joint on the guide rail;
    wherein the drive means is adapted for moving the trailing-edge flap relative to the wing structure by moving the guide rail along the carriage by moving the first joint relative to the wing structure, such that the trailing-edge flap translates and rotates, and wherein the trailing-edge flap is at least movable into a cruise position, a high-lift position, and an air brake position;
    wherein the drive means comprises a rotary actuator, a drive lever attached to the actuator, a swing lever coupled with the drive lever, and a connection link coupled with the swing lever and the first joint;
    wherein the drive lever and the swing lever are configured for exclusively moving on a first plane with a fixed spatial relationship to the wing; and
    wherein the first joint is configured to be rotatable exclusively about a rotational axis that is substantially parallel to the first plane.

2. The trailing-edge flap system of claim 1, wherein the guide rail is firmly attached to the trailing-edge flap.

3. The trailing-edge flap system of claim 1, wherein the first joint is positioned on an upstream end of the trailing-edge flap.

4. The trailing-edge flap system of claim 1, wherein the drive means, the guide rail and the carriage comprise a five-linkage-track-chain.

5. The trailing-edge flap system of claim 4, wherein the connection link is configured for rotating substantially exclusively on the first plane.

6. The trailing-edge flap system of claim 4, wherein the first joint is configured to be rotatable substantially exclusively about a fifth rotational axis that is substantially parallel to the first plane.

7. The trailing-edge flap system of claim 6, wherein the carriage is configured to be rotatable substantially exclusively about a fourth rotational axis that is parallel to the first plane.

8. The trailing-edge flap system of claim 7, wherein the fourth rotational axis is substantially parallel to the fifth rotational axis.

9. The trailing-edge flap system of claim 1, wherein the actuator is configured for rotating an articulation point substantially on the first plane.

10. The trailing-edge flap system of claim 9, wherein the swing lever is connected to the articulation point of the actuator.

11. The trailing-edge flap system of claim 10, wherein the swing lever is configured for exclusively rotating on the first plane.

12. A trailing-edge flap system for an aircraft wing structure, comprising:
    a trailing-edge flap movable to a cruise position, a high-lift position, and an air-brake position;
    a straight guide rail fixedly coupled to the trailing-edge flap and having a first joint positioned on an upstream end thereof;
    a carriage slidably engaging the guide rail and rotatably coupled to a position on the wing structure; and
    a drive means coupled to the wing structure and to the first joint for moving the trailing edge flap relative to the wing structure by moving the guide rail along the carriage;
    wherein the drive means is adapted to move the first joint exclusively on a first plane with a fixed spatial relationship to the wing.

13. The trailing-edge flap system of claim 12, wherein the drive means comprises:
    an actuator; and
    a connection link coupled to the first joint and an articulation point of the actuator, wherein the drive means, the guide rail, and the carriage comprise a five-linkage-track-chain.

14. The trailing-edge flap system of claim 13 wherein the actuator is a rotary actuator configured to rotate the articulation point on the first plane, and wherein the drive means comprises a swing lever coupled to the articulation point of the actuator and the connection link.

15. The trailing-edge flap system of claim 14 wherein the drive means comprises a swing lever coupled to the articulation point of the actuator and to the connection link and configured for rotating the articulation point on the first plane having a fixed spatial relationship to the wing.

* * * * *